(12) United States Patent
Zhuang et al.

(10) Patent No.: US 12,469,317 B2
(45) Date of Patent: Nov. 11, 2025

(54) HANDWRITING TEXT RECOGNITION APPARATUS SUPPORTING MULTIPLE WRITING DIRECTIONS

(71) Applicants: Jianming Zhuang, Singapore (SG); Chung Kwong Chan, Shenzhen (CN)

(72) Inventors: Jianming Zhuang, Singapore (SG); Chung Kwong Chan, Shenzhen (CN)

(73) Assignee: SUNIAPTE, LTD., Singapore (SG)

( * ) Notice: Subject to any disclaimer, the term of this patent is extended or adjusted under 35 U.S.C. 154(b) by 376 days.

(21) Appl. No.: 18/218,021

(22) Filed: Jul. 4, 2023

(65) Prior Publication Data

US 2025/0014369 A1 Jan. 9, 2025

(51) Int. Cl.
*G06V 30/142* (2022.01)
*G06F 3/04883* (2022.01)

(52) U.S. Cl.
CPC ...... *G06V 30/1423* (2022.01); *G06F 3/04883* (2013.01)

(58) Field of Classification Search
CPC .................................................... G06V 30/142
See application file for complete search history.

(56) References Cited

U.S. PATENT DOCUMENTS

| | | | |
|---|---|---|---|
| 2014/0298266 A1* | 10/2014 | Lapp | G06F 3/04886 715/835 |
| 2017/0004122 A1* | 1/2017 | Taniguchi | G06F 3/04883 |
| 2021/0350122 A1* | 11/2021 | Dixon | G06V 30/36 |

* cited by examiner

*Primary Examiner* — Di Xiao

(57) ABSTRACT

A handwriting text recognition apparatus supporting multiple writing directions comprising a processor and a memory; a stroke input processor serving to receive a plurality of online handwriting character string tracks which are exploded into a plurality of strokes; a writing direction determination operator connected to the stroke input processor for calculating a writing direction of the online handwriting character string tracks by using a coordinate of a center of gravity and a plurality of second central moments of a plurality of sampling points of the strokes; a stroke sorting operator connected to the writing direction determination operator and sorting the strokes by the writing direction to obtain an x direction labeled sorting stroke set or a y direction labeled sorting stroke set; and wherein the x direction labeled sorting stroke set or the y direction labeled sorting stroke set is input to a recognition model for recognition.

8 Claims, 5 Drawing Sheets

HANDWRITING TEXT RECOGNITION APPARATUS SUPPORTING MULTIPLE WRITING DIRECTIONS

FIELD OF THE INVENTION

The present invention is related to a text recognition system, and in particular to a handwriting text recognition apparatus supporting multiple writing directions.

BACKGROUND OF THE INVENTION

Online handwriting text recognition technology is a technology which converts strokes of handwriting texts into character strings. As comparing with the recognition of printing texts, recognition of handwriting texts is necessary to consider writing habits of the writers, and thus it is more difficult. While as comparing with offline handwriting text recognition, the online handwriting text recognition has additional information of time sequence of strokes and less background noises and thus it has higher recognition accuracy.

Most of the online handwriting recognition systems in the prior arts are designed for recognition of text with horizontal writing direction. However, languages such as Chinese, Japanese and Korean have traditionally vertical writing style which is still used on some occasions today. Even sometimes horizontal writing direction and vertical writing direction are used in combination, for Chinese Spring couplets, vertical writing direction is used for the right and left scrolls of the couplets while horizontal writing direction is used for the top scroll of the couplets. Therefore, it would be useful if there is an online handwriting text recognition system that supports both horizontal direction and vertical writing direction without requiring the user to manually switch between different recognition modes. Although an overlay handwriting text recognition model of the prior arts supports multi-directional writing, it does not support handwriting texts written with strokes having a reversed order at the same time.

In addition, in the optical text recognition technology of the prior arts, a classifier is commonly used to distinguish horizontal and vertical writing directions in the input texts, and then the horizontal writing and vertical writing directions are processed separately, such as rotating the vertically writing text. However, above method will encounter difficulties when it is used to process more other writing directions.

Therefore, the present invention desires to provide a novel invention to solve the disadvantages of above prior arts.

SUMMARY OF THE INVENTION

Accordingly, for improving above mentioned defects in the prior art, the object of the present invention is to provide a handwriting text recognition apparatus supporting multiple writing directions, wherein the advantages of the present invention are that the present invention can recognize tracks of strokes of handwriting texts written in various directions as a string of characters, and can support any handwriting text written with strokes having an arbitrary or reversed order. It is worth noting that there is no need to specifically collect vertical handwriting text in the training stage of the present invention, which eliminates the cost of collecting and labeling of data samples. The present invention obtains a higher recognition accuracy of recognizing handwriting texts with various writing directions, and provides the corresponding relations between input strokes and output characters. The present invention also supports text recognition of any handwriting text written with strokes having an arbitrary or reversed order. In real application of the present invention, a required text recognition range can be configured to support the application of opened or closed dictionaries. The present invention can also be applied to real-time handwriting text recognition on mobile phones or tablet computers.

To achieve above object, the present invention provides a handwriting text recognition apparatus supporting multiple writing directions comprising: a processor and a memory; the processor being used to execute required operations of the handwriting text recognition apparatus and the memory storing data, programs and related operation results of the handwriting text recognition apparatus; a stroke input processor serving to receive a plurality of online handwriting character string tracks from an handwriting electronic input device; the online handwriting character string tracks being exploded into a plurality of strokes; each of the strokes including a plurality of sampling points; a writing direction determination operator connected to the stroke input processor for calculating a writing direction of the online handwriting character string tracks for recognition of a direction of an online handwriting character string; the writing direction being represented by an angle $\theta$ which is calculated by using a coordinate of a center of gravity and a plurality of second central moments of the sampling points of the strokes; a stroke sorting operator connected to the writing direction determination operator; the stroke sorting operator sorting the strokes by the writing direction calculated by the writing direction determination operator; wherein when the angle $\theta$ represented as the writing direction is between $-\pi/4$ and $\pi/4$, that is a direction indicated by the writing direction is closer to a horizontal axis than a vertical axis and the online handwriting character string tracks is tend to have a horizontal writing direction, the stroke sorting operator sorts the strokes according to an order from the stroke with a smallest x coordinate to the stroke with a largest x coordinate so as to obtain an x direction labeled sorting stroke set; while when the angle $\theta$ represented as the writing direction is between $\pi/4$ and, $3\pi/4$, that is the direction indicated by the writing direction is closer to the vertical axis than the horizontal axis and the online handwriting character string tracks is tend to have a vertical writing direction, the stroke sorting operator sorts the strokes according to an order from the stroke with a smallest y coordinate to the stroke with a largest y coordinate so as to obtain a y direction labeled sorting stroke set; wherein the strokes belonging to one single character are tend to be clustered together by sorting of the stroke sorting operator; and wherein the x direction labeled sorting stroke set or the y direction labeled sorting stroke set is input to a recognition model for recognition.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 3:
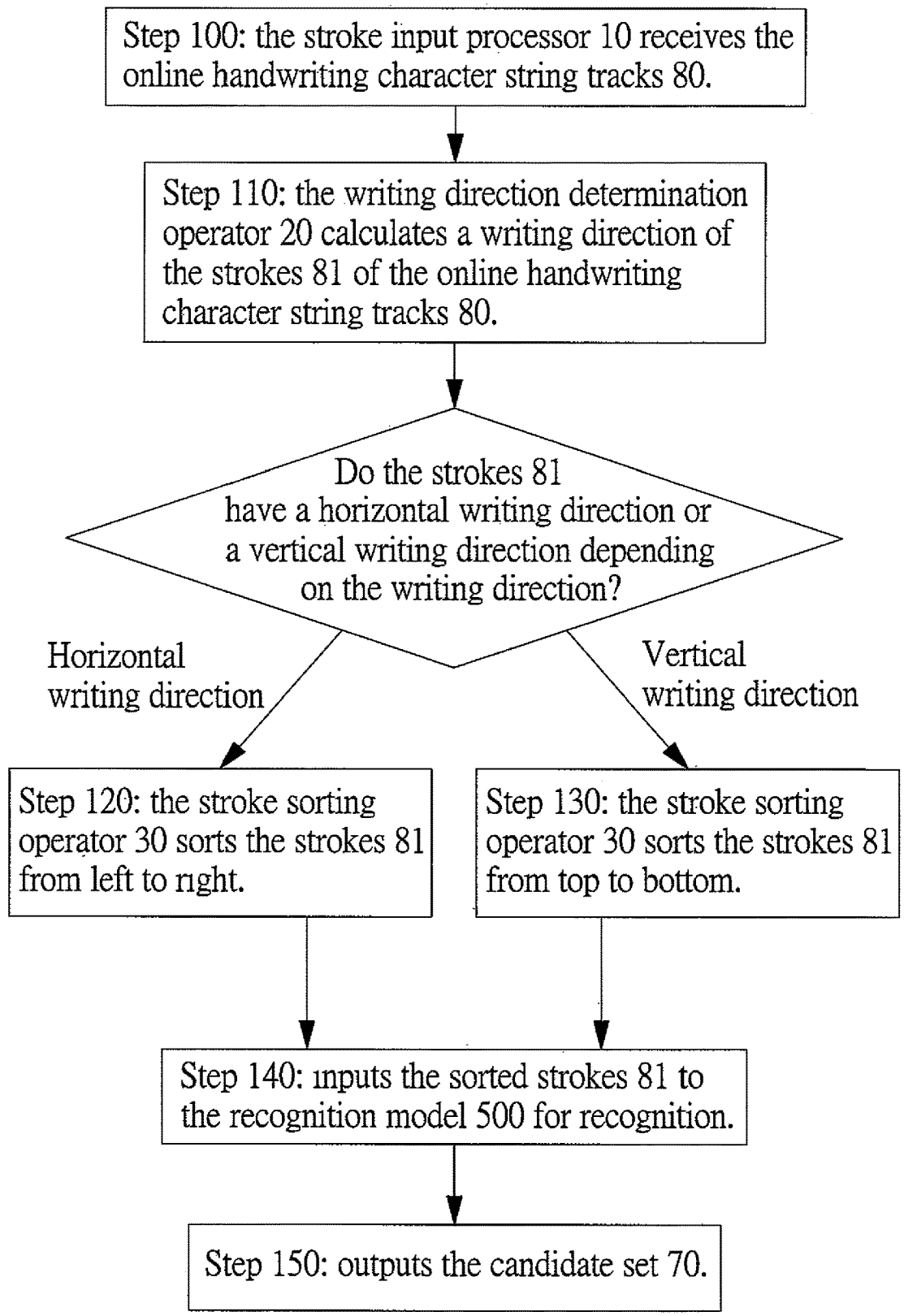
FIG. 3 is a steps flow diagram showing recognizing of the present invention.
Figure 4:
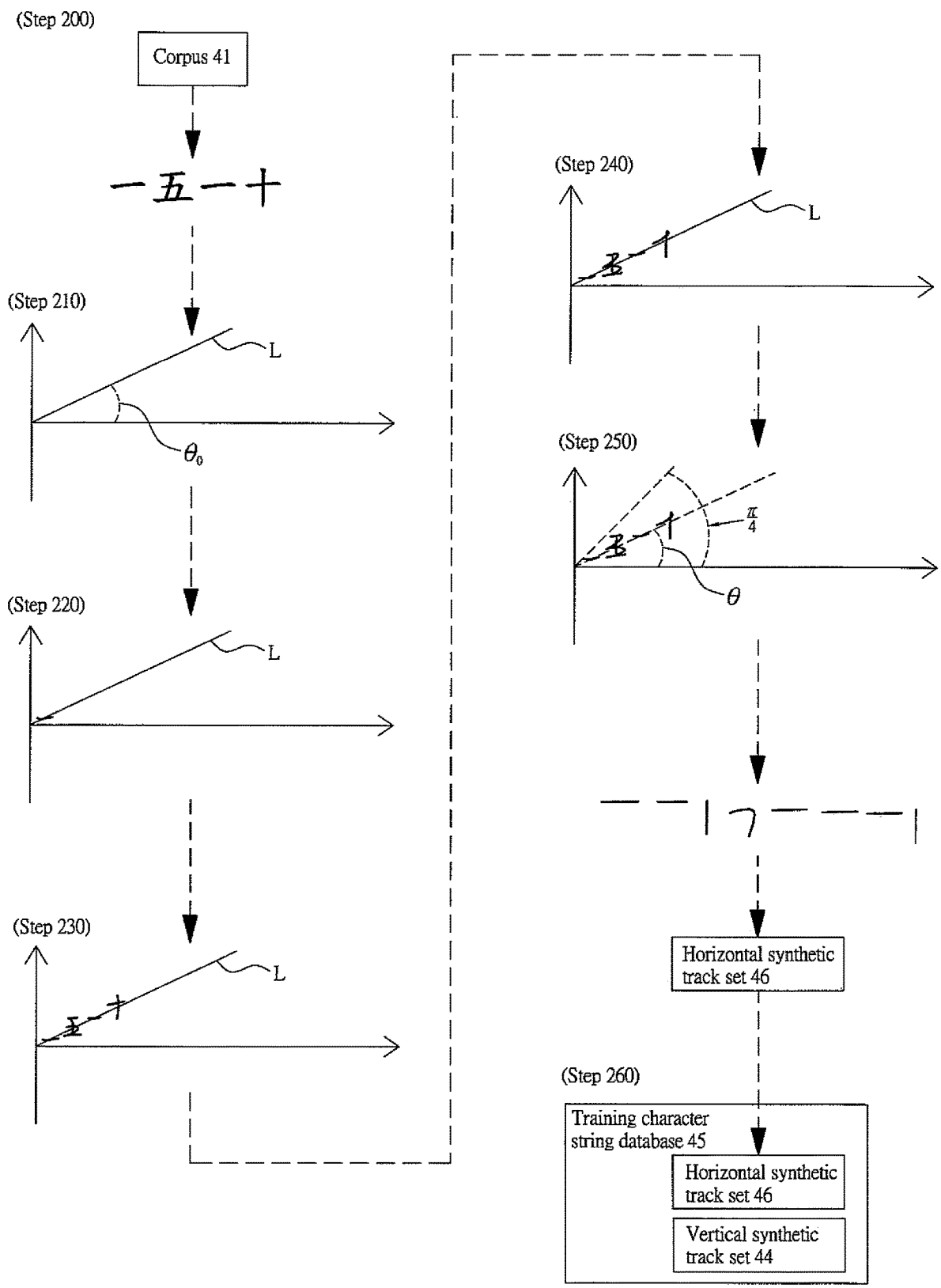
FIG. 4 is a steps flow diagram showing generating of the training samples of the present invention.
Figure 5:
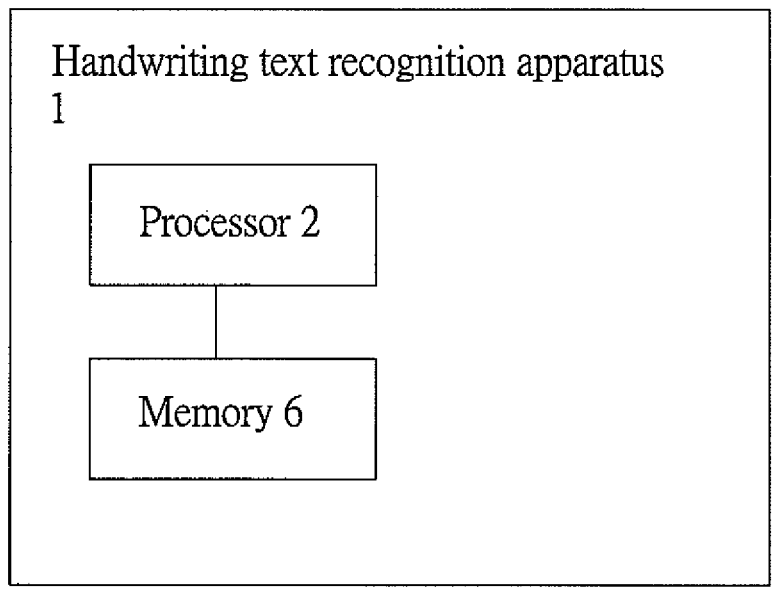
FIG. 5 is a structured block diagram showing the elements of the handwriting text recognition apparatus of the present invention.

With reference to FIGS. 1 to 5, a handwriting text recognition apparatus supporting multiple writing directions of the present invention is illustrated. The handwriting text recognition apparatus 1 includes a processor 2 and a memory 6, as shown in FIG. 5. The processor 2 is used to execute required operations of the handwriting text recognition apparatus 1 and the memory 6 stores data, programs and related operation results of the handwriting text recognition apparatus 1.

In the present invention, handwriting texts recognition is modeled as a Sequence to Sequence model. Input of the model is a sequence of sampling points (including x coordinates, y coordinates, and stroke end tokens) expressing strokes of handwriting texts, while output of the model is a character string (a sequence of characters) corresponding to the strokes. Both lengths (numbers) of the input strokes and the output character string are not fixed. The present invention provides a recognition model 500 which is a neural network based on an Encoder-Decoder model for handwriting texts recognition. The handwriting text recognition apparatus 1 further includes the following elements.

A stroke input processor 10 serves for receiving a plurality of online handwriting character string tracks 80 from an handwriting electronic input device 600 (referring to a step 100 in FIG. 3). The online handwriting character string tracks 80 are exploded into a plurality of strokes 81. Each of the strokes 81 includes a plurality of sampling points 82. The stroke input processor 10 pre-processes the strokes 81 of the online handwriting character string tracks 80 in a training stage and a prediction stage of the neural network of the present invention.

A writing direction determination operator 20 is connected to the stroke input processor 10 for calculating a writing direction of the online handwriting character string tracks 80 for identification of a direction of an online handwriting character string (referring to the step 110 of FIG. 3). In the present invention, sorting of the strokes 81 is used as a preprocessing step to ensure that the recognition results are independent of an order of the strokes 81. The sorting of the strokes 81 relies on the writing direction calculated by the writing direction determination operator 20. The writing direction of the online handwriting character string tracks 80 is calculated by following method.

The sampling points 82 of each of the strokes 81 are re-sampled before calculating of the writing direction to make stroke distances between each two adjacent points of the same stroke 81 are approximately the same.

In calculating of the writing direction, number of the strokes 81 is defined as m. The $i^{th}$ stroke 81 of the strokes 81 is composed of $n_i$ sampling points 82 which are represented as $(x_{i,1}, y_{i,1}), (x_{i,2}, y_{i,2}), \ldots, (x_{i,n_i}, y_{i,n_i})$. Total number of the sampling points 82 of the strokes 81 is $n=\Sigma_{i=1}^{m} n_i$. A coordinate of a center of gravity of the sampling points 82 of the strokes 81 is $(\bar{x}, \bar{y})$, wherein $$\bar{x} = \frac{1}{n}\sum_{i=1}^{m}\sum_{j=1}^{n_i} x_{i,j}, \bar{y} = \frac{1}{n}\sum_{i=1}^{m}\sum_{j=1}^{n_i} y_{i,j}, j = 1, \ldots, n_i.$$

Three second central moments of the sampling of points 82 the strokes 81 are $$I_{xx} = \frac{1}{n}\sum_{i=1}^{m}\sum_{j=1}^{n_i}(x_{i,j}-\bar{x})^2, I_{xy} = \frac{1}{n}\sum_{i=1}^{m}\sum_{j=1}^{n_i}(x_{i,j}-\bar{x})(y_{i,j}-\bar{y}),$$

$$I_{yy} = \frac{1}{n}\sum_{i=1}^{m}\sum_{j=1}^{n_i}(y_{i,j}-\bar{y})^2.$$

An angle θ between an x-axis and a line which minimizes a sum of squares of distances from each of the sampling points 82 to the line is $$\theta_1 = \frac{1}{2}\arctan\left(\frac{2I_{xy}}{I_{xx}-I_{yy}}\right) \text{ or } \theta_2 = \theta_1 + \frac{\pi}{2}.$$

The writing direction is the angle $\theta=\theta_k$ wherein $$k = \underset{k=1,2}{\operatorname{argmax}}\bigl(I_{xx}\cos^2(\theta_k) + 2I_{xy}\cos(\theta_k)\sin(\theta_k) + I_{yy}\sin^2(\theta_k)\bigr).$$

The calculated writing direction (represented by the angle θ) is used as an estimated writing direction of the online handwriting character string.

Figure 2:
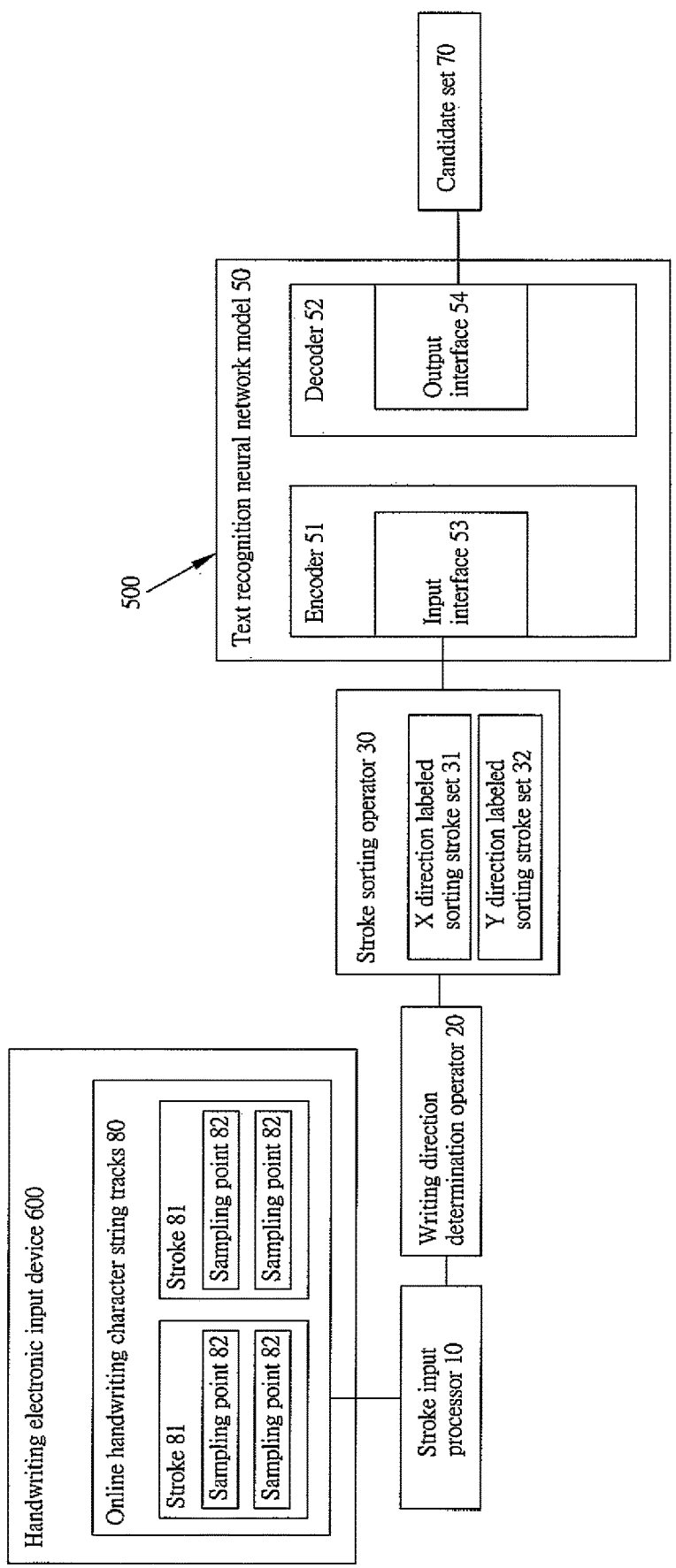
FIG. 2 is a structured block diagram showing the elements of the prediction stage of the recognition model of the present invention.

A stroke sorting operator 30 is connected to the writing direction determination operator 20. The stroke sorting operator 30 sorts the strokes 81 by the writing direction calculated by the writing direction determination operator 20, as shown in FIG. 2. The writing direction is represented by the angle θ. When the angle θ represented as the writing direction is between −π/4 and π/4, that is a direction indicated by the writing direction is closer to a horizontal axis (x-axis) than a vertical axis (y-axis) and the online handwriting character string tracks 80 is tend to have a horizontal writing direction, the stroke sorting operator 30 sorts the strokes 81 according to an order from the stroke 81 with a smallest x coordinate to the stroke 81 with a largest x coordinate (from top to bottom) so as to obtain an x direction labeled sorting stroke set 31 (referring to the step 120 of FIG. 3).

While when the angle θ represented as the writing direction is between π/4 and 3π/4, that is the direction indicated by the writing direction is closer to the vertical axis (y-axis) than the horizontal axis (x-axis) and the online handwriting character string tracks 80 is tend to have a vertical writing direction, the stroke sorting operator 30 sorts the strokes 81 according to an order from the stroke 81 with a smallest y coordinate to the stroke 81 with a largest y coordinate (from left to right) so as to obtain a y direction labeled sorting stroke set 32 (referring to the step 130 of FIG. 3).

For handwriting character strings with various writing directions, those strokes 81 belonging to one single character are tend to be clustered together by sorting of the stroke sorting operator 30. Therefore, each character in the online handwriting character string tracks 80 can be correctly exploded and recognized in the subsequent recognizing.

Figure 1:
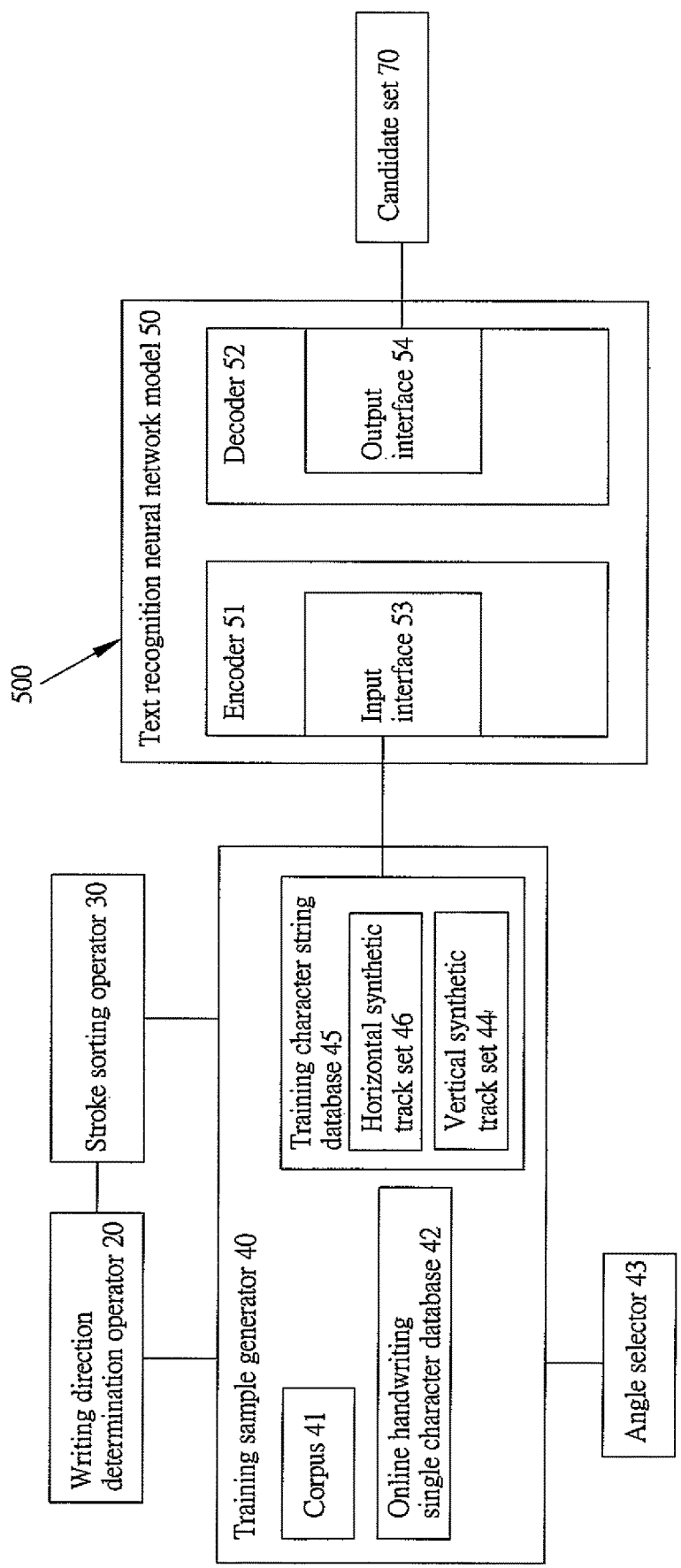
FIG. 1 is a structured block diagram showing the elements of the training stage of the recognition model of the present invention.

A training sample generator 40 is connected to the writing direction determination operator 20 and the stroke sorting operator 30. The training sample generator 40 serves to generate a plurality of training samples for training of the neural network in the training stage, as shown in FIG. 1. The present invention uses synthetic training samples for reducing works of collecting additional handwriting samples.

An angle selector 43 is connected to the training sample generator 40. The angle selector 43 serves to provide a training angle as a writing direction of the training sample.

The training sample generator 40 includes a corpus 41, an online handwriting single character database 42 and a training character string database 45. The corpus 41 composed of natural language texts. The corpus 41 is composed of a plurality of natural language texts, which is a well-compiled balanced corpus or a web texts corpus collected by a web crawler. The online handwritten single character database 42 includes a plurality of handwriting track sets and each of the handwriting track sets includes a plurality of handwriting tracks which correspond to a single character.

Referring to FIG. 4, in generating of the training sample, the training sample is generated by using the following steps:

Step 200: the training sample generator 40 randomly selects one text having a length in a determined range from the corpus 41 as a training text. The training text is composed of a character string which includes a plurality of characters.

Step 210: the training sample generator 40 selects one training angle $\theta_0$ between $-\pi/4$ and $\pi/4$ or between $\pi/4$ and $3\pi/4$ from the angle selector 43, and setups a base line L with the training angle $\theta_0$ as an inclination angle of the base line L. When the training angle $\theta_0$ selected by the training sample generator 40 is between $-\pi/4$ and $\pi/4$ the base line L is considered as a horizontal line. When the training angle $\theta_0$ selected by the training sample generator 40 is between $\pi/4$ and $3\pi/4$, the base line L is considered as a vertical line.

Step 220: the training sample generator 40 finds the handwriting track set corresponding to $1^{st}$ character of the training text from the online handwritten single character database 42, and moves the handwriting track set corresponding to the $1^{st}$ character to a starting point of the base line L. A center of the handwriting track set corresponding to the $1^{st}$ character is located at the starting point of the base line L. The handwriting track set corresponding to the $1^{st}$ character is distributed along a direction of a track of the base line L.

Step 230: for each of rest characters of the training text, the training sample generator 40 finds corresponding handwriting track sets from the online handwritten single character database 42 in sequence, and moves each of the corresponding handwriting track sets to a position after a previous handwriting track set on the track of the base line L. A center of each of the handwriting track sets positioned on the base line L is located at the track of the base line L. Distances between two centers of every two adjacent handwriting track sets on the base line L obey a normal distribution.

Step 240: the training sample generator 40 slightly deforms the handwriting tracks of all the handwriting track sets positioned on the base line L to obtain a simulated character string track set. The simulated character string track set is a plurality of tracks of a plurality of strokes corresponding to the character string of the training text.

Step 250: the writing direction of the simulated character string track set is calculated by the writing direction determination operator 20 (because the writing direction of the simulated character string track set will be slightly changed to be different from the training angle $\theta_0$ during the deforming in the previous step 240). When the writing direction of the simulated character string track set is between $-\pi/4$ and $\pi/4$ the stroke sorting operator 30 sorts the strokes of the simulated character string track set according to x coordinates of sampling points of the strokes of the simulated character string track set so as to obtain a horizontal synthetic track set 46. While when the writing direction of the simulated character string track set is between $\pi/4$ and $3\pi/4$, the stroke sorting operator 30 sorts the strokes of the simulated character string track set according to y coordinates of sampling points of the strokes of the simulated character string track set so as to obtain a vertical synthetic track set 44. FIG. 4 shows that the writing direction is between $\pi/4$ and $\pi/4$, so the stroke sorting operator 30 sorts the strokes of the simulated character string track set according to x coordinates of the sampling points of the strokes of the simulated character string track set so as to obtain a horizontal synthetic track set 46.

Step 260: the horizontal synthetic track set 46 or the vertical synthetic track set 44 obtained by the stroke sorting operator 30 is used as one training sample and is stored in the training character string database 45 by the training sample generator 40.

The training samples generated by the training sample generator 40 cover various writing directions, and these training samples have meaningful text contents and certain similarities with human handwriting. The training samples are used for training the recognition model 500. At the same time, in these training samples, a correspondence between each of the characters of the training text and the strokes in each of the handwriting track sets of the simulated character string track set is deterministic, which is useful for training the recognition model 500 and some other models, for example, it can be used to the attention of artificial neural networks to generate more accurate alignments.

In the present invention, the recognition model 500 may be any Sequence to Sequence model trained by End-to-End Learning. In the present invention, the recognition model 500 is the text recognition neural network model 50 which is based on an Encoder-Decoder model.

The recognition model 500 is connected to the stroke sorting operator or the training character string database 45. The recognition model 500 is a text recognition neural network model 50. The text recognition neural network model 50 includes an encoder 51 which includes an input interface 53, and a decoder 52 which includes an output interface 54. The input interface 53 is connected to the stroke sorting operator 30 or the training character string database 45. The input interface 53 serves to receive a stroke data from the stroke sorting operator 30 or the training character string database 45. The stroke data includes the x direction labeled sorting stroke set 31 or y direction labeled sorting stroke set 32 from the stroke sorting operator 30, or the strokes of the horizontal synthetic track set 46 or vertical synthetic track set 44 and a corresponding character string to the strokes from the training character string database 45. The text recognition neural network model 50 repeatedly recognizes and calculates the stroke data to acquire a plurality of possible character strings and reliabilities (referring to the step 140 of FIG. 3). The possible character strings and reliabilities are stored in a candidate set 70 which is output from the output interface 54 (referring to the step 150 of FIG. 3).

Referring to FIG. 1, in the training stage of the text recognition neural network model 50, the strokes of the horizontal synthetic track set 46 or vertical synthetic track set 44 are used as input values of the text recognition neural network model 50. The characters of the character string corresponding to the strokes of the horizontal synthetic track set 46 or the vertical synthetic track set 44 are used as expected output values of the text recognition neural network model 50. As a result, a supervised learning can be used to train the text recognition neural network model 50 by using the horizontal synthetic track set 46 or the vertical synthetic track set 44 and the corresponding character string of the horizontal synthetic track set 46 or the vertical synthetic track set 44. The horizontal synthetic track set 46 or the vertical synthetic track set 44 has handwriting tracks including sorted strokes for better simulating the input values in the prediction stage of the text recognition neural network model 50.

Referring to FIG. 2, in the prediction stage of the text recognition neural network model 50, input of the recognition model 500 is a sequence of sampling points 82 of the strokes 81. The writing direction of the strokes is calculated by the writing direction determination operator 20 and is input to the stroke sorting operator 30 for acquiring the x direction labeled sorting stroke set 31 or y direction labeled sorting stroke set 32 according to whether the writing direction is closer to a horizontal axis than a vertical axis. In the prediction stage of the text recognition neural network model 50, the sampling points of the strokes 81 of the x direction labeled sorting stroke set 31 or the y direction labeled sorting stroke set 32 are used as input values of the text recognition neural network model 50. Output values of the text recognition neural network model 50 are a sequence of characters (a character string).

Preferably, the training samples generated by the training sample generator 40 are based on text strokes written in a horizontal writing direction, a vertical writing direction, and other writing directions to ensure that the recognition model 500 can be trained by sorted strokes from these text strokes written in various writing directions.

In a test stage of the recognition model 500, some other horizontal synthetic track sets or vertical synthetic track sets may be generated for obtaining a recognition accuracy of the recognition model 500.

Advantages of the present invention are that the present invention can recognize tracks of strokes of handwriting texts written in various directions as a string of characters, and can support any handwriting text written with strokes having an arbitrary or reversed order. It is worth noting that there is no need to specifically collect vertical handwriting text in the training stage of the present invention, which eliminates the cost of collecting and labeling of data samples. The present invention obtains a higher recognition accuracy of recognizing handwriting texts with various writing directions, and provides the corresponding relations between input strokes and output characters. The present invention also supports text recognition of any handwriting text written with strokes having an arbitrary or reversed order. In real application of the present invention, a required text recognition range can be configured to support the application of opened or closed dictionaries. The present invention can also be applied to real-time handwriting text recognition on mobile phones or tablet computers.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A handwriting text recognition apparatus supporting multiple writing directions comprising:
   a processor and a memory; the processor being used to execute required operations of the handwriting text recognition apparatus and the memory storing data, programs and related operation results of the handwriting text recognition apparatus;
   a stroke input processor serving to receive a plurality of online handwriting character string tracks from an handwriting electronic input device; the online handwriting character string tracks being exploded into a plurality of strokes; each of the strokes including a plurality of sampling points;
   a writing direction determination operator connected to the stroke input processor for calculating a writing direction of the online handwriting character string tracks for recognition of a direction of an online handwriting character string; the writing direction being represented by an angle θ which is calculated by using a coordinate of a center of gravity and a plurality of second central moments of the sampling points of the strokes;
   a stroke sorting operator connected to the writing direction determination operator; the stroke sorting operator sorting the strokes by the writing direction calculated by the writing direction determination operator; wherein when the angle θ represented as the writing direction is between $\pi/4$ and $\pi/4$, that is a direction indicated by the writing direction is closer to a horizontal axis than a vertical axis and the online handwriting character string tracks is tend to have a horizontal writing direction, the stroke sorting operator sorts the strokes according to an order from the stroke with a smallest x coordinate to the stroke with a largest x coordinate so as to obtain an x direction labeled sorting stroke set; while when the angle θ represented as the writing direction is between $\pi/4$ and $3\pi/4$, that is the direction indicated by the writing direction is closer to the vertical axis than the horizontal axis and the online handwriting character string tracks is tend to have a vertical writing direction, the stroke sorting operator sorts the strokes according to an order from the stroke with a smallest y coordinate to the stroke with a largest y coordinate so as to obtain a y direction labeled sorting stroke set;
   wherein the strokes belonging to one single character are tend to be clustered together by sorting of the stroke sorting operator; and
   wherein the x direction labeled sorting stroke set or the y direction labeled sorting stroke set is input to a recognition model for recognition.

2. The handwriting text recognition apparatus supporting multiple writing directions as claimed in claim 1, wherein the recognition model is a Sequence to Sequence model trained by End-to-End Learning.

3. The handwriting text recognition apparatus supporting multiple writing directions as claimed in claim 1, wherein the recognition model is a text recognition neural network model which is based on an Encoder-Decoder model; in a prediction stage of the text recognition neural network model, the sampling points of the strokes of the x direction labeled sorting stroke set or the y direction labeled sorting stroke set are used as input values of the text recognition neural network model; output values of the text recognition neural network model are a sequence of characters.

4. The handwriting text recognition apparatus supporting multiple writing directions as claimed in claim 1, further comprising:
a training sample generator connected to the writing direction determination operator and the stroke sorting operator; the training sample generator serving to generate a plurality of training samples;
an angle selector connected to the training sample generator; the angle selector serving to provide a training angle;
wherein the training sample generator includes a corpus, an online handwriting single character database and a training character string database; the corpus composed of natural language texts; the online handwritten single character database includes a plurality of handwriting track sets and each of the handwriting track sets includes a plurality of handwriting tracks which correspond to a single character;
wherein in generating of the training sample, the training sample generator randomly selects one text having a length in a determined range from the corpus as a training text; the training text is composed of a character string which includes a plurality of characters; and the training sample generator selects one training angle between $-\pi/4$ and $\pi/4$ or between $\pi/4$ and $3\pi/4$ from the angle selector, and setups a base line with the training angle as an inclination angle of the base line; when the training angle selected by the training sample generator is between $-\pi/4$ and $\pi/4$, the base line is considered as a horizontal line; when the training angle selected by the training sample generator is between $-\pi/4$ and $3\pi/4$, the base line is considered as a vertical line; the training sample generator finds the handwriting track set corresponding to $1^{st}$ character of the training text from the online handwritten single character database, and moves the handwriting track set corresponding to the $1^{st}$ character to a starting point of the base line; a center of the handwriting track set corresponding to the $1^{st}$ character is located at the starting point of the base line; the handwriting track set corresponding to the $1^{st}$ character is distributed along a direction of a track of the base line; for each of rest characters of the training text, the training sample generator finds corresponding handwriting track sets from the online handwritten single character database in sequence, and moves each of the corresponding handwriting track sets to a position after a previous handwriting track set on the track of the base line; a center of each of the handwriting track sets positioned on the base line is located at the track of the base line; distances between two centers of every two adjacent handwriting track sets on the base line obey a normal distribution; and the training sample generator slightly deforms the handwriting tracks of all the handwriting track sets positioned on the base line to obtain a simulated character string track set; the simulated character string track set is a plurality of tracks of a plurality of strokes corresponding to the character string of the training text; and the writing direction of the simulated character string track set is calculated by the writing direction determination operator; when the writing direction of the simulated character string track set is between $-\pi/4$ and $\pi/4$, the stroke sorting operator sorts the strokes of the simulated character string track set according to x coordinates of sampling points of the strokes of the simulated character string track set so as to obtain a horizontal synthetic track set; while when the writing direction of the simulated character string track set is between $\pi/4$ and $3\pi/4$, the stroke sorting operator sorts the strokes of the simulated character string track set according to y coordinates of sampling points of the strokes of the simulated character string track set so as to obtain a vertical synthetic track set; the horizontal synthetic track set or the vertical synthetic track set obtained by the stroke sorting operator is used as one training sample and is stored in the training character string database by the training sample generator; and
wherein the training samples generated by the training sample generator cover various writing directions; and a correspondence between each of the characters of the training text and the strokes in each of the handwriting track sets of the simulated character string track set is deterministic; the training samples are used for training the recognition model.

5. The handwriting text recognition apparatus supporting multiple writing directions as claimed in claim 4, wherein the recognition model is a text recognition neural network model; in the training stage of the text recognition neural network model, the strokes of the horizontal synthetic track set or vertical synthetic track set are used as input values of the text recognition neural network model; and the characters of the character string corresponding to the strokes of the horizontal synthetic track set or the vertical synthetic track set are used as expected output values of the text recognition neural network model.

6. The handwriting text recognition apparatus supporting multiple writing directions as claimed in claim 4, wherein the recognition model is a text recognition neural network model; the text recognition neural network model includes an encoder which includes an input interface, and a decoder which includes an output interface; the input interface is connected to the stroke sorting operator or the training character string database; the input interface serves to receive a stroke data from the stroke sorting operator or the training character string database; the stroke data includes the x direction labeled sorting stroke set or y direction labeled sorting stroke set from the stroke sorting operator, or the strokes of the horizontal synthetic track set or vertical synthetic track set and a corresponding character string from the training character string database; the text recognition neural network model repeatedly recognizes and calculates the stroke data to acquire a plurality of possible character strings and reliabilities; the possible character strings and reliabilities are stored in a candidate set which is output from the output interface.

7. The handwriting text recognition apparatus supporting multiple writing directions as claimed in claim 4, wherein the corpus is a balanced corpus or a web texts corpus collected by a web crawler.

8. The handwriting text recognition apparatus supporting multiple writing directions as claimed in claim 1, wherein the sampling points of each of the strokes are re-sampled before calculating of the writing direction to make stroke distances between each two adjacent sampling points of the same stroke are approximately the same; and
wherein in calculating of the writing direction, number of the strokes is defined as m; the $i^{th}$ stroke of the strokes is composed of $n_i$ sampling points which are represented as $(x_{i,1}, y_{i,1}), (x_{i,2}, y_{i,2}), \ldots, (x_{i,n_i}, y_{i,n_i})$; total number of the sampling points of the strokes is $n = \sum_{i=1}^{m} n_i$; a coordinate of a center of gravity of the sampling points of the strokes is $(\bar{x}, \bar{y})$, wherein $$\bar{x} = \frac{1}{n}\sum_{i=1}^{m}\sum_{j=1}^{n_i} x_{i,j}, \bar{y} = \frac{1}{n}\sum_{i=1}^{m}\sum_{j=1}^{n_i} y_{i,j}, j = 1, \ldots, n_i;$$

three second central moments of the sampling points of the strokes are $$I_{xx} = \frac{1}{n}\sum_{i=1}^{m}\sum_{j=1}^{n_i}(x_{i,j}-\bar{x})^2, I_{xy} = \frac{1}{n}\sum_{i=1}^{m}\sum_{j=1}^{n_i}(x_{i,j}-\bar{x})(y_{i,j}-\bar{y}),$$

$$I_{yy} = \frac{1}{n}\sum_{i=1}^{m}\sum_{j=1}^{n_i}(y_{i,j}-\bar{y})^2;$$

the angle $\theta$ between an x-axis and a line which minimizes a sum of squares of distances from each of the sampling points to the line is $$\theta_1 = \frac{1}{2}\arctan\left(\frac{2I_{xy}}{I_{xx}-I_{yy}}\right) \text{ or } \theta_2 = \theta_1 + \frac{\pi}{2};$$

and the writing direction is the angle $\theta = \theta_k$, wherein $$k = \underset{k=1,2}{\operatorname{argmax}}\left(I_{xx}\cos^2(\theta_k) + 2I_{xy}\cos(\theta_k)\sin(\theta_k) + I_{yy}\sin^2(\theta_k)\right).$$

* * * * *